United States Patent [19]

Cafarella et al.

[11] Patent Number: 5,412,620
[45] Date of Patent: May 2, 1995

[54] HYDROACOUSTIC COMMUNICATIONS SYSTEM ROBUST TO MULTIPATH

[75] Inventors: John H. Cafarella, Swampscott; Stanley A. Reible, Chelmsford; Jeffrey H. Fischer, Boston; Kendrick R. Bennett, Tewksbury, all of Mass.

[73] Assignee: Micrilor, Inc., Wakefield, Mass.

[21] Appl. No.: 130,668

[22] Filed: Oct. 1, 1993

Related U.S. Application Data

[63] Continuation of Ser. No. 36,494, Mar. 24, 1993, abandoned.

[51] Int. Cl.⁶ ............................................. H04B 11/00
[52] U.S. Cl. .................................... 367/134; 340/850
[58] Field of Search ....................... 367/134; 375/1, 6; 455/40; 340/850

[56] References Cited

U.S. PATENT DOCUMENTS

| | | | |
|---|---|---|---|
| 3,593,256 | 7/1971 | Gannon | 367/134 |
| 4,109,100 | 8/1978 | Unkauf | 375/54 |
| 4,203,164 | 5/1980 | Isaak et al. | 367/134 |
| 4,951,263 | 8/1990 | Shope | 367/134 |
| 5,029,147 | 7/1991 | Andrews et al. | 367/134 |
| 5,303,207 | 4/1994 | Brady et al. | 367/134 |

OTHER PUBLICATIONS

S. A. Reible, "Underwater Data Communications Using Hydroacoustic Spread Spectrum", IEEE UFFC Chapter Meeting Lexington, Mass. 22 Apr. 1992.
J. H. Fischer, K. R. Bennett, S. A. Reible, J. H. Cafarella, I. Yoa, "High Data Rate, Underwater Acoustic Data-Communications Transceiver," Proc. of Mastering the Oceans Through Technology, (Oceans 92), Newport, R.I. pp. 571-576 Oct. 26-29, 1992.
R. A. Iltis and A. W. Fuxjaeger, "A Digital DS Spread Spectrum Receiver with Joint Channel and Doppler Shift Estimation," IEEE Trans. Comm. v. 39, No. 8, Aug. 1991 pp. 1255-1267.
Compendex Plus Data Base Search 1970-1992/Jan.

*Primary Examiner*—Daniel T. Pihulic
*Attorney, Agent, or Firm*—Lappin & Kusmer

[57] ABSTRACT

A hydroacoustic communication system employs spread spectrum to mitigate multipath interference caused by acoustic reflections off underwater surfaces and other large boundaries or acoustic discontinuities. The system is particularly beneficial for mitigating errors due to surface reflections, and for mitigating interference due to unwanted signals having a delay ranging from tens of microseconds to hundreds of milliseconds.

39 Claims, 8 Drawing Sheets

HYDROACOUSTIC COMMUNICATIONS SYSTEM ROBUST TO MULTIPATH

This is a continuation of application Ser. No. 08/036,494, filed on Mar. 24, 1993, now abandoned.

FIELD OF INVENTION

This invention relates generally to underwater hydroacoustic communications, and more particularly underwater hydroacoustic communications for use in high-data rate applications.

BACKGROUND OF THE INVENTION

Underwater communication of data is often difficult. Underwater cabled data-communications connections are costly and are known to suffer from a variety of reliability problems, such as failure of cables due to material fatigue, excessive torque on connectors, and accidental entanglement by fishing boats and other vessels. Hydroacoustic data transmission is in many cases a preferred alternative. Data can be transmitted in to an observer either as raw measurement samples, or as pre-processed data. Instrument status signals can also be transmitted. Deployment of hydroacoustic transceivers is much less expensive and more readily accomplished than the deployment of cabled systems, particularly in the case of multiple transceiver units that are networked together. Several significant application areas are: environmental monitoring of underwater parameters and contamination, communication with underwater robotic vehicles, and control of underwater industrial apparatus. Since real-time data transfer is required in many underwater applications, it is important that an underwater data communications system provide high data rates with a high degree of reliability.

Underwater data communications systems that operate acoustically are typically limited to data rates of less than 50 bits per second (bps), and are characterized by low reliability, due to an interference phenomenon called "multipath", also known as "acoustic reverberation". An acoustic signal commonly traverses many paths as it travels towards a receiver. Multiple propagation paths can be caused by reflections from surfaces in the environment, for example. Some of these paths are longer than others. Therefore, since each version of the signal travels at the same speed, some versions of the signal will arrive after other versions of the signal. Sometimes the delayed signals will interfere with more prompt signals as they arrive at the receiver, causing signal degradation.

The multipath time-delay spread is the time that elapses between the moment that the earliest version of a transmitted signal arrives at a receiver, and the moment that the latest version of the signal arrives at the receiver.

Of particular importance in underwater communications are reflections of signals off the surface of the water, i.e., at the water-air interface. These reflected signals are ubiquitous, and have changing amplitudes and delays. The amplitudes of the reflected signals are sometimes nearly equal to the amplitude of the direct signal.

To understand multipath interference effects, it will first be necessary to explain the term "symbol". One or more symbols can be combined to form a message that conveys meaning. Each symbol must be uniquely recognizable, and is selected from a set of possible symbols, referred to as a symbol alphabet. For example, the letters "a", "b", and "c" are symbols from the English alphabet. The numbers "0" and "1" are symbols of the binary number system. It is possible to represent symbols from a first alphabet with symbols from a second alphabet, such as representing the letter "a" by the combination of binary digits "00010010". Alternatively, the binary digit "0" can be represented by the combination of letters "zero".

To be transmitted via a transmission medium, a symbol must be represented as at least a portion of a signal waveform. The portion of a transmitted signal waveform corresponding to a symbol waveform is demodulated in the receiver over a period of time called a coherent integration interval, given correct synchronization. Correct synchronization requires that integration of the signal waveform begin at the actual beginning of the portion of the signal waveform that corresponds to a symbol. In the absence of correct synchronization, the symbol waveforms and therefore the meaning of the message will be misinterpreted.

Consider the case of a message transmitted as a binary data modulation waveform, wherein each message symbol consists of a single bit. When the multipath time-delay spread is longer than the temporal symbol separation, i.e., the time between symbols in the message, bits of the first received signal version overlap non-corresponding bits of the last received signal version. This phenomena is called intersymbol interference (ISI). In a typical underwater environment, the time-delay spread can often range from 0.1 milliseconds (ms) to 200 ms, for example. Since, in binary data modulation, data rate is the reciprocal (multiplicative inverse) of symbol duration, a time delay spread of 200 ms implies that data rates even much less than 5 bits per second (bps) will result in significant data errors due to intersymbol interference.

In addition to the intersymbol interference, some multipath reflections may have delay spreads that fall within the time between symbols. This type of multipath effect, referred to as intrasymbol interference, can cause significant degradation in the amplitude of the net received signal.

There are two types of intrasymbol interference. Reflections of significant amplitude having a delay that exceeds a half wavelength of the carrier frequency will cause periodic energy nulls in the frequency spectrum of the net received signal due to coherent cancellation at those frequencies. The bandwidth of the frequency nulls is inversely proportional to the delay of the signals that are interfering. This type of signal loss, commonly known as "frequency selective fading", undermines the reliability of the underwater communications link.

Another more serious type of intrasymbol interference occurs when a signal undergoes specular (mirror-like) reflection at the water surface at a grazing angle, i.e., the reflected signal path is substantially tangential to the surface. The water surface has a reflection coefficient that is approximately $-1$, meaning that the reflected signal experiences a 180° phase shift with respect to the incident signal. The amplitude of the reflected signal is a function of the degree of smoothness of the water surface, where amplitude decreases with increasing surface roughness.

When the delay is a small fraction of the period of the carrier frequency, there will be signal cancellation at all signal frequencies from 0 Hz to the frequency at which the effect no longer occurs, which is a function of the geometry. This signal cancellation is called the "Lloyd mirror" effect. The Lloyd mirror effect is particularly a problem at shallow depths. Unlike "reverberation", which refers to interference due to many paths of significant delay, the Lloyd mirror effect is specifically due to the signals that have grazed the water surface, and have thereby experienced an amplitude inversion at the water surface. These inverted signals cancel the direct signal at the receiver. At shallow depths, as in shallow coastal waters, for example, and at moderate ranges, grazing signals are only slightly delayed with respect to the direct signals.

Both the Lloyd mirror effect and frequency selective fading assume a fixed geometric relationship of a transmitter, a reflecting surface, and a receiver, and result in signal loss over a range of frequencies. A received signal can also be adversely affected when frequency is held constant and the geometric relationship varies. As either the transmitter or receiver are moved in a direction that is normal to the reflecting surface, the received signal level varies as a function of position, the function being analogous to "grating lobes", a radiation pattern attributable to transducer behavior. Since the surface of a body of water is always in motion, the received signal amplitude is always modulated by the grating lobes.

Overcoming frequency selective fading is commonly accomplished using diversity methods that employ both spatial diversity and frequency diversity. Spatial diversity requires at least two receivers, each receiver having a spatially separate receive transducer so as to provide a different frequency selectivity pattern for each transducer. By contrast, frequency diversity receivers share a single broadband receive transducer, where the transmitted signal is duplicated and then transmitted on at least two carriers of respective frequencies that are separated by a frequency bandwidth that is larger than the frequency range of a frequency null.

The diversity receiver unit includes a plurality of receivers, each tuned to one of the carrier frequencies. The receiver outputs of either method fade independently, and are advantageously combined in one of several known ways to compensate for such independent fading. However, since this method employs a plurality of independent receivers, it can be quite costly to implement.

Another approach to overcoming the Lloyd mirror effect involves the use of a carrier of sufficiently high frequency to transform interference due to the Lloyd mirror effect into interference due to frequency selective fading. Nevertheless, diversity must still be employed to overcome the resulting interference.

Regarding intersymbol interference, to be distinguished from intrasymbol interference discussed above, there are known methods for mitigating intersymbol interference due to multipath effects, while also providing high data rates. To exploit the fact that signals having the longest delays often arrive from angles far from the central axis of the transducer, a first such method employs highly directional line-of-sight data links having high gain acoustic transducers. One problem with this method is that to obtain high transducer gain, large transducer arrays which are difficult to deploy and stabilize are required. Also, each transducer must be carefully oriented. Such transducer arrays are therefore complicated and expensive to install and to move.

A second method employs echo canceling techniques implemented with adaptive filters. At high data rates, the high expense and demanding computational requirements of adaptive filters is prohibitive in the dynamic environment of underwater acoustic communications.

A third method is to channelize the transmitted waveform into multiple channels, each channel being of different carrier frequency and of lower bandwidth (and therefore of longer symbol duration) than the single-channel transmitted waveform. Each channel is then received independently. This approach is excessively costly because one independent receiver per channel is required.

A fourth and less conventional approach is to use orthogonal signalling, wherein the waveform that represents each symbol has no projection on the respective waveform of any other symbol of the symbol alphabet from which the symbols of the message are selected. Consequently each symbol in the alphabet is more easily distinguished from other symbols in the alphabet than without the orthogonality property. If the temporal symbol duration of the orthogonal signal is made much longer than the multipath time delay spread, the effect of the multipath can be reduced. For example, one of many approaches includes the use of M-ary frequency shift keying (MFSK) modulation to encode the high-level symbol alphabet into one of M frequencies. However, in this context, orthogonal signaling requires a diversity receiver to overcome intrasymbol interference. Also, a lot of bandwidth is required to implement orthogonal signaling as compared with a communications channel without orthogonal signaling.

Generally, these approaches for eliminating intersymbol interference must also provide for diversity reception to mitigate intrasymbol interference, and consequently must operate duplicate receivers.

OBJECTS OF THE INVENTION

It is a general object of the present invention to provide an underwater acoustic communications system of the type described that overcomes the problems of the prior art.

More specific objects of the present invention include providing a underwater acoustic communications system that achieves high data rate while providing reliable communications in the presence of intersymbol and intrasymbol interference, including the Lloyd mirror effect.

Another object of the invention is to overcome intersymbol and intrasymbol interference resulting from multipath effects, and to thereby provide superior data rates and system reliability.

Yet another object of the invention is to provide a communications system robust to intersymbol interference that is superior in its versatility, adaptability, low computation requirements, so as to provide low cost and low power consumption.

SUMMARY OF THE INVENTION

The invention provides an apparatus and method for mitigating multipath effects while providing high symbol rates in an underwater communications data link. Direct-sequence spread spectrum (DSSS) technology is used to mitigate both intersymbol and the intrasymbol interference caused by acoustic reverberations. The worst of these reverberations is the surface reflection and sufficient spread spectrum bandwidth must be used to fully mitigate this particular reflection. The use of spread spectrum technology allows an underwater communications system to separate the desired signal, which arrives from a direct, line-of-sight (LOS) path from reflected signals which arrive with somewhat greater delays. The resolution with which this separation process can be carried out depends on the inverse of the filtered spread spectrum bandwidth. Furthermore, since the spread spectrum approach can utilize spreading codes which do not repeat for thousands of data bits, intersymbol interference from signals which arrive with substantial multipath delay spread are mitigated. This method of applying spread spectrum signaling to underwater communications can provide a substantial increase in data rate over traditional signaling; this is particularly true when significant reflections from the sea surface, the sea bottom, or other objects are present.

In the method envisioned herein, two or more transceiver units can be employed in a data-communications link to provide simplex, half-duplex, or full-duplex communications. Each transceiver would be outfitted with a transmit and receive channel, which may or may not occupy the same frequency band. For simplex operation, one unit would serve as a transmitter, while the others would function as receivers. For half-duplex operation, two transceivers would be able to transmit and receive, but not simultaneously. For full duplex operation, two units would transmit and receive simultaneously over two separate channels. Furthermore, more than two units can be utilized to form a communications network. The implementation is designed to achieve the immediate timing synchronization necessary to create an efficient data communications network.

BRIEF DESCRIPTION OF THE DRAWING

The invention will be more fully understood from the following detailed description, in conjunction with the accompanying figures, wherein.

DETAILED DESCRIPTION OF A PREFERRED EMBODIMENT

For the purposes of the present discussion, it is useful to identify two major types of multipath. The "near-in" type occurs when a reflected signal traverses a path that is only slightly longer than the path taken by the direct, line-of-sight signal, thereby causing coherent cancellation and deep fading of the signal power. The symbols of the reflected signal are time-shifted with respect to the direct signal by less than the duration of one symbol, and so the interference resulting therefrom is also referred to as "intrasymbol" interference. This type of multipath results when a signal path reflects off a surface at a grazing angle.

Figure 1:
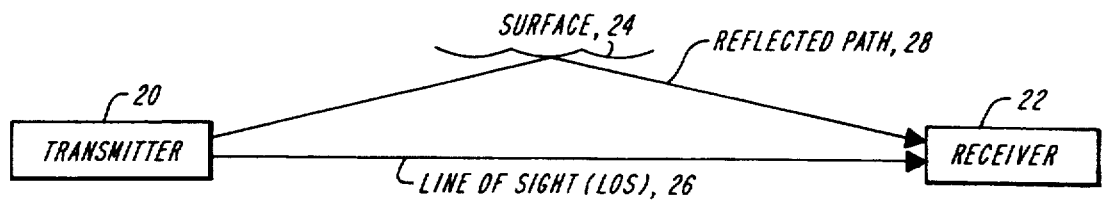
FIG. 1 is a block diagram of a transmitter, a receiver, and signal path geometry.

FIG. 1 shows transmitter 10 that emits a direct line-of-sight (LOS) signal 12 and a reflected signal 14 that is reflected off a reflecting surface 16. Both the direct LOS signal 12 and the reflected signal 14 are received by a receiver 18. These signals 12 and 14 destructively interfere, as indicated by nulls in the resulting frequency spectrum which indicate the frequencies where interference occurs. If a narrowband signal (as commonly used in traditional communications) traverses both of these paths and modulates a carrier signal that occupies a nulled frequency, the amplitude of the modulated signal would be substantially diminished, perhaps down to the level of the noise, resulting in data errors. This effect is known as multipath fading.

For example, at a range of 1 km, and an orthogonal distance from the line of sight path of 8 m to a reflector disposed equidistantly with respect to each transceiver, the reflected signal traverses an additional 15 cm relative to the distance traversed by the line-of-sight (LOS) signal. Assuming that the propagation velocity in water is approximately 1540 m/s, the reflected signal arrives about 100 μs later than the LOS signal. If the reflection is specular, which is often the case, the amplitude of the reflected signal can be nearly equal to the amplitude of the LOS, thereby causing deep multipath fading.

The "far-out" type of multipath occurs when a reflected signal travels a distance sufficiently greater than the distance traversed by the line-of-sight signal so as to cause a delay greater than the duration of one data symbol. The interference that results is called "intersymbol interference" (ISI). The causes of reflection can be similar to the causes of reflection in "near-in" type multipath, but the geometry of the transceiver locations with respect to the reflecting surfaces creates an excess path length that can extend beyond many symbol durations before it is sufficiently attenuated below the amplitude of the LOS signal. Prior to the invention, far-out multipath imposed a limitation on the data rate of binary communications.

When the reflection of the signal corresponding to a first data bit overlays the direct path signal corresponding to a second data bit, ISI results. ISI can cause data recovery errors at the receiver. For example, if the transceivers are separated by 500 meters, and a reflector is disposed at an orthogonal distance of 250 meters from the line-of-sight path and equidistantly with respect to each transceiver, there is a reflected path that is 207 meters longer than the direct path traversed by the line-of-sight (LOS) signal. This signal is delayed from the line of sight signal by 134 ms at a velocity of 1540 m/s. (Equivalent to over 80 data bits at a 625 bps binary data rate). If a carrier frequency is chosen such that the attenuation factor of the sea water is approximately 15 dB/km, the excess attenuation of this signal, including radiative spreading loss, is approximately 6 dB. It is known that when ISI is −6 dB (relative to the intended signal), a 3 dB implementation loss at a bit error rate of $10^{-5}$ results.

Figure 2:
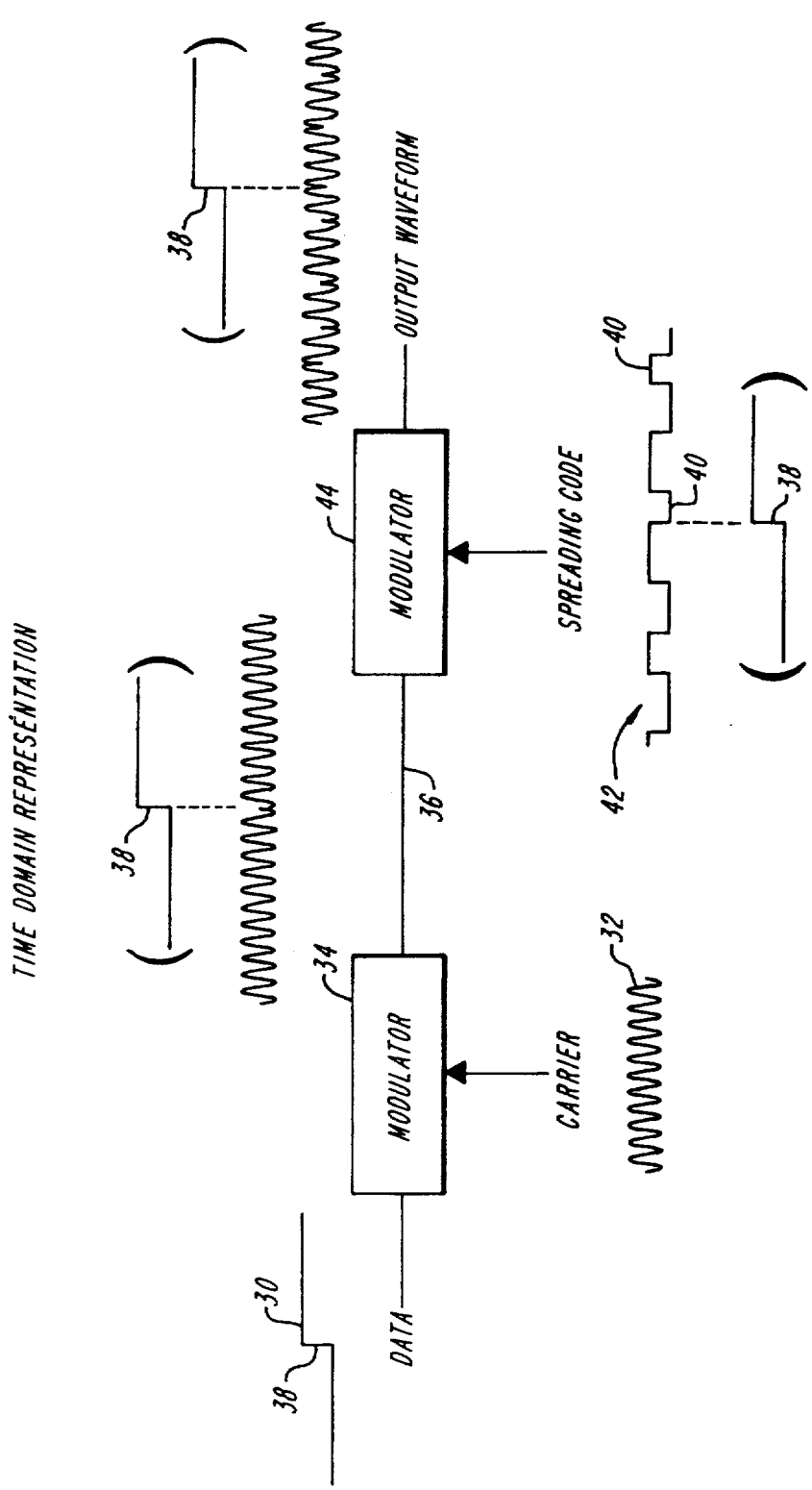
FIG. 2 is a block diagram of a spread spectrum modulator.

With reference to FIG. 2, direct-sequence pseudo-noise (DS-PN) spread spectrum techniques employ a multiplicative modulation step that spreads the transmitted signal over a much larger bandwidth than is normally required to support the data rate. For example, binary data 30 is used to phase-shift-key modulate a carrier signal 32 in a first modulator 34. The output 36 of the first modulator 34 has a frequency bandwidth that is on the order of the data rate. The sharp, near-discontinuity 38 that occurs at the point of phase inversion is responsible for the high frequency energy components in the resulting spectrum.

The finest pulse structure 40 in the DS-PN spreading code 42 is commonly referred to as a chip 40, so as to differentiate it from a bit, which usually refers to data only. The DS-PN spreading code 42 can be, for example, phase-shift-key modulated onto this waveform 36 in a second modulator 44 resulting in many more phase inversions within each data symbol. The output of the second modulator 44 has a bandwidth that is on the order of the DS-PN code data rate. The order of application of these modulations can be reversed, and the modulations can also take the form of minimum-shift-keying and various other continuous-phase-shift-keying waveforms that are known in the art.

Figure 3:
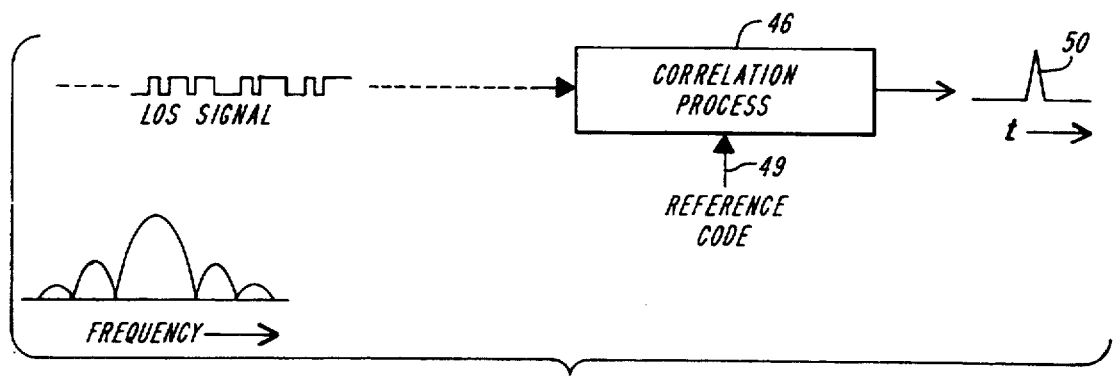
FIG. 3 is block diagram of a generic correlation process.

Referring to FIG. 3, at a receiver 46, the spreading code 42 is removed by a correlation process 48, such as matched filtering or serial correlation, using a reference code 49. The correlation process 48 provides a linear decomposition of the individual propagation paths that make up the received signal. The decomposition is inherent in the signal processing and requires no feedback. Therefore, wideband channel dynamics can be handled without computational strain, in contrast with adaptive equalizer systems.

As depicted in FIG. 3, the receiver 46 must perform a cross-correlation of the local reference code 49 and the received LOS signal 50 which may be corrupted by noise, interference from unwanted signal sources, and multipath. The spreading code 42 is chosen such that its autocorrelation function is nearly zero everywhere except where the codes are aligned. Where the codes align, there occurs a triangular pulse 51 (or correlation spike) of width $2/T_c$ at its base, where $1/T_c$ is the clock rate (and approximately the bandwidth) of the generator of the spreading code. Recall that each bit of the spreading code 49 is referred to as a chip, to distinguish it from a data bit. Thus, if there are sixteen chips of spreading sequence in a cross-correlation interval, i.e., the period of each data bit, the correlation process will indicate which of sixteen output bins will manifest significant signal energy (correlation spike), the remaining fifteen bins having negligible signal energy, i.e., no appreciable signal spike.

Figure 4:
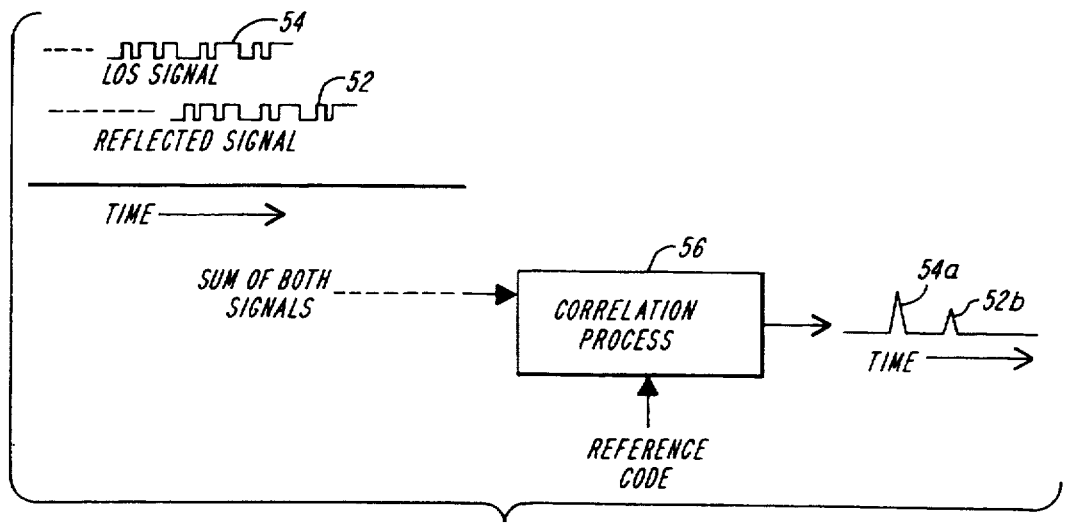
FIG. 4 is block diagram of correlation processing of two multipath signals that are overlapping and summed.

Referring to FIG. 4, to mitigate severe near-in multipath fading, DS-PN spread spectrum resolves in time the individual signal paths of the reflected signal 52 and the LOS signal 54 so that they no longer interfere. After the correlation process 56, each signal 52 and 54 is represented by a delayed correlation spike 52A and 54A, respectively, each spike having an amplitude which represents received signal strength. In fact, the output of the correlation process approximates the impulse response of the communication channel, resolved to the spreading bandwidth, as it is the linear sum of all of the autocorrelation functions.

According to the invention, another benefit of the use of DS-PN spread spectrum signaling is the mitigation of the severe far-out multipath ISI. This is achieved by changing the spread spectrum coding on each data symbol so that the ISI from previous data symbols does not correlate with the coding on any other symbol.

The code rate in the preferred embodiment of the transceiver of the invention is 10 kHz, which allows the resolution of paths that differ in length by as little as six inches. Thus, for a transmission at a 1 km range, and at a depth of 8 m, the surface bounce can be resolved. For operating depths greater 8 m, the surface bounce signal is greater than six inches longer than the LOS signal.

Figure 5A:
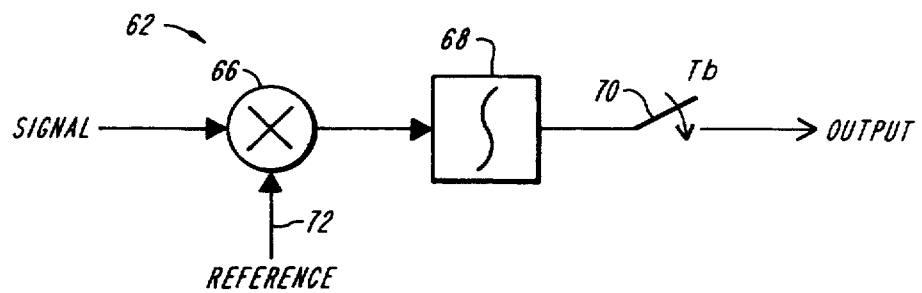
FIGS. 5A and 5B are block diagrams for comparing a serial correlator to a matched filter.
Figure 5B:
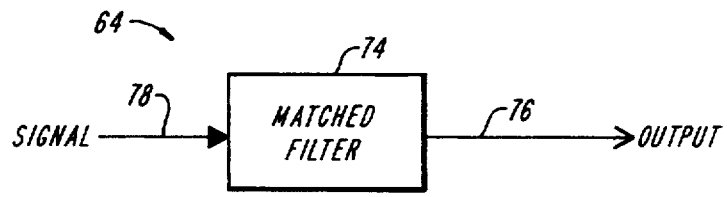

Referring to FIG. 5, a serial correlator 62 (also called a sliding correlator) tests for signal detection after a period of processing called the detection interval. Then, the serial correlaltor 62 shifts the timing of the reference signal 72 by a duration that is less than or equal to the duration of a DS-PN code chip. The number of detection intervals that must be checked determines the duration of the preamble that must be transmitted prior to a data packet. This search process is slow, and in an underwater environment can result in timing ambiguities because a reflected signal cannot be distinguished from an earlier-arriving LOS signal.

If the data packets are much longer than the preamble required for serial correlator synchronization, then the preamble will not affect the communications channel throughput efficiency, but the ambiguity of the timing of the LOS signal will still occur. In underwater communications, the LOS is seldom obstructed, and when the multipath is resolved using DSSS signalling, the LOS signal is the preferred signal to demodulate.

However, if it is desirable for the duration of the data packet to be short compared to the serial correlator search time, then a matched filter can be used. Short data packets are sometimes required for optimizing the traffic flow according to the type of data that is to be transmitted, for re-transmission control, or for operating in burst-interference environments.

Figure 10:
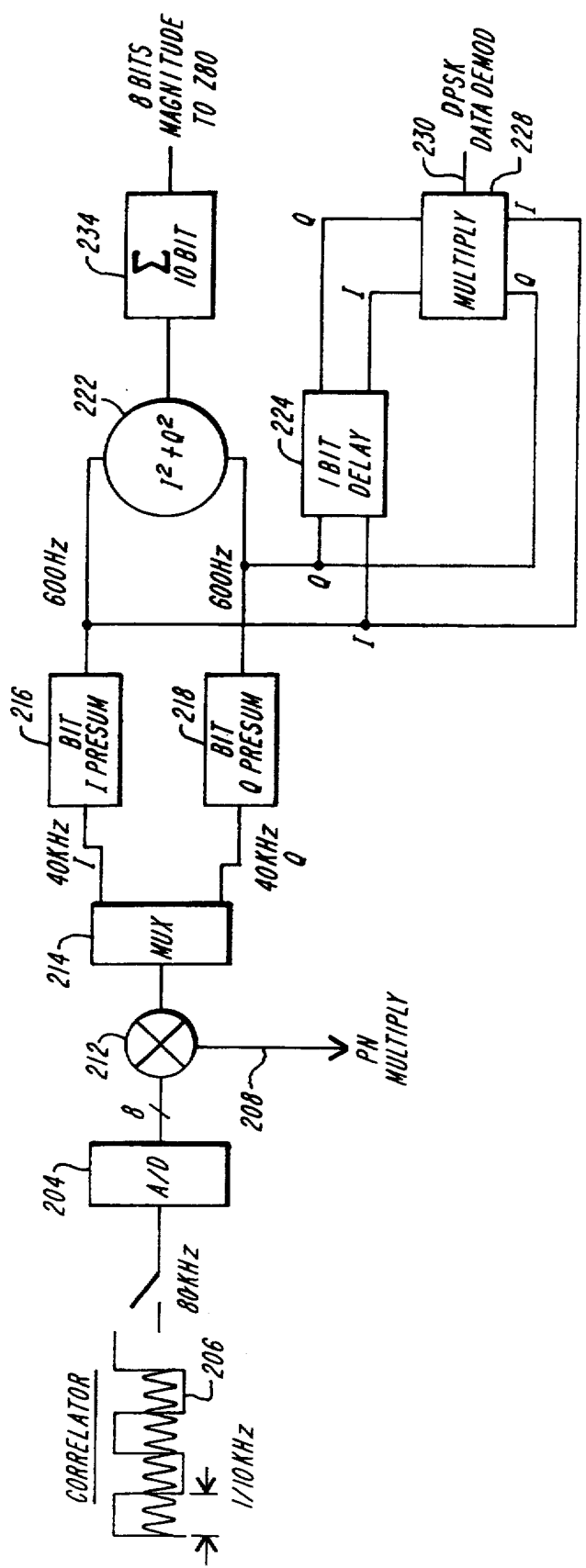
FIG. 10 is a schematic diagram of an embodiment of the steps of signal processing in the correlator processor of FIG. 5A.

It is commonly known that a matched filter synchronizer, or an equivalent device, will test all code timing relationships in a single detection interval, and therefore can serve as a fast synchronizer. The matched filter synchronization will be unambiguous in timing, because the earliest arriving signal will be the first detected output from the matched filter. This signal is the desired, highly stable LOS signal. Various approximations to a full-scale matched filter include a binary-quantized-input matched filter, or a matched filter that includes some non-coherent processing, or a matched filter that uses inner and outer PN code structures, as shown in FIG. 10.

If the packets are longer than the clock stability or Doppler shift will allow, then a time-tracking loop must be used to maintain the synchronization throughout the transaction. If the Doppler specification for the receiver is severe, then a Doppler compensating loop is required.

Figure 6:
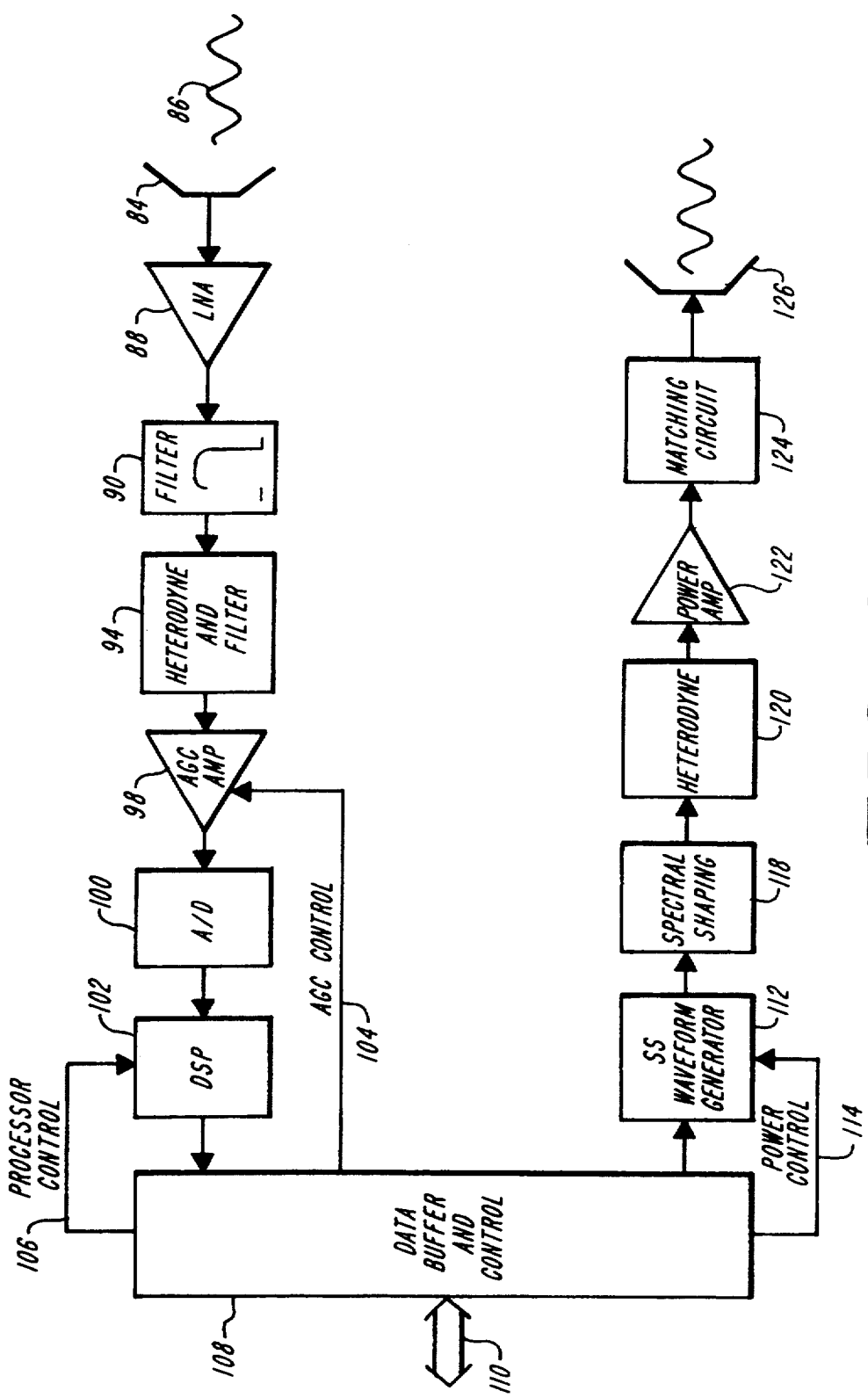
FIG. 6 is a block diagram of an embodiment of the transceiver of the invention.

An embodiment of a single transceiver is shown in FIG. 6. The received hydroacoustic signal 86 is received by a hydroacoustic transducer 84 that provides an electronic signal that is amplified by a low noise amplifier (LNA) 88. The rest of the receiver signal conditioning circuits include an amplifier/filter chain, which chain includes a bandpass filter 90, a down-converter 94 which translates the input signal to an intermediate frequency (IF) frequency of 20 kHz, an AGC section 98, and an A/D converter 100. The AGC 98 is operated conventionally with feedback 104 to regulate the power level of the raw received signal, but with an additional capability of performing coherent AGC which regulates the level of the correlated signal. The pre-conditioned signal provided by module 98 is sampled at 80 kHz, and is converted to a digital format by A/D converter 100. The digital signal processing subsystem 102 provides further signal filtering prior to performing matched filtering and correlation functions described below. The receiver obtains control information from processor 108 which is responsible for data buffering and generation of DSP control signals 106. The processor 108 also provides a host computer interface 110.

The transmit spread spectrum waveform generator 112 includes a feedback shift register sequence generator and a means to create a digital power control word 114 under instructions from the processor 108. A finite impulse response (FIR) digital filter 118 with associated D/A conversion circuitry provides spectral shaping. An up-conversion stage 120 and a differential power amplifier driver 124 create a bandpass signal to transmit. Transmit power control is accomplished in software by varying the data in the waveform generator 112 that is sent to the FIR filter 118. The 2-Watt transmit power amplifier 122 is of a custom design providing a highly linear response. A matching circuit 124 provides an impedance match to the transducer 126.

0.0.1 Signal Processing

Two implementations of the correlation process are shown conceptually in FIG. 5. The serial correlator 62 consists of a spread spectrum waveform generator signal 72, which may be generated as simply as by using a digital shift register with feedback to create the PN waveform, a multiplier 66, which is often a mixer, and an integrator 68, which must have some means for resetting each symbol after the output is sampled by a sampler 70.

The matched filter 64 shown in FIG. 5 implements the correlation with a filter 74 that has an impulse response that is a time-reversed replica of the spread spectrum modulation. The output signal 76 is the time convolution of the input signal and the matched filter impulse response.

In general, the process of matched filtering a symbol provides a completely asynchronous method of correlation processing. Whereas, the process of serial-correlation against an actively generated reference code provides a synchronous method of correlation processing, and therefore must be precisely timed. The timing can be input from another process or may be swept out over many repetitions of a repeated transmit code. Short, repeated codes cause ambiguous timing results; particularly in the undersea channel where the multipath delays can exceed the correlator integration interval.

The matched filter does not require any signal timing information as all delays are calculated simultaneously; however, this process is far more computationally intensive than the serial correlation. The matched filter does not require repeated code to synchronize, and hence there is no ambiguity in the transmitted waveform. The first signal out is the LOS which in the undersea channel is the desired signal to lock to as this signal is generally very stable and the others are wildly fluctuating.

In this receiver, both the matched filter and the correlator are used. Both are implemented in sequence in the same DSP chip. First a matched filter is used to synchronize the timing. Then the correlator is used, which obtains its timing from the matched filter output so it does not have to sweep time. The rationale for this is that when the receiver is idling, awaiting a detection, most of its instruction cycles are available. After detection, a matched filter is no longer necessary as timing is known from there on, so the less computationally intensive serial correlation can be used, and the excess processing power of the DSP chip is used to do things like data demodulation, AGC, and tracking timing over long periods of time through Doppler shifts, clock drifts, and range, with a delay-locked loop.

The tracking allows a single transmission to be of indefinite length; yet, the matched filter detection allows for an efficient use of the communications resources even with the use of much shorter, packetized transmissions. For example, a group of these transceivers could be readily networked together in a multi-hop repeater structure. Well known protocols from terrestrial and satellite communications networks may be applied in doing so, with the caveat that the propagation delay for 1 km under water is on the order of 0.6 sec. The delay must be taken in context with the data rate. In synchronous-orbit satellite communications, delays are in the tenths of seconds but the data rate is much higher. Therefore, the ratio of minimum packet size to propagation delay is actually better in the undersea transceiver. This ratio often determines the performance of a network. One advantage of packetizing is the ability to do efficient retransmission of packets with data errors. Smaller packet size translates into less time retransmitting if an error occurs (as detected by the packet CRC check).

The PN code rate used for synchronization is 10 kHz which is formed with a 2.5 kHz outer code multiplied by a 10 kHz, 4-chip-long inner code. The code stream for demodulation is a very long 10-kHz m-sequence, although other sequences can readily be used. The larger bandwidth inner code is preferred as this reduces the minimum operating depth for any given range because the near-in multipath reflections are better resolved during synchronization. The inner code is repeated each time, and therefore only improves the "clear area" with the added time resolution but does not reduce peak sidelobes of the outer code. The advantage of using an inner/outer code structure here is that the MF can be constructed with a 4-chip-long MF followed by a 16-chip-long MF instead of using a 64-chip-long MF, thus saving computational load.

Figure 7:
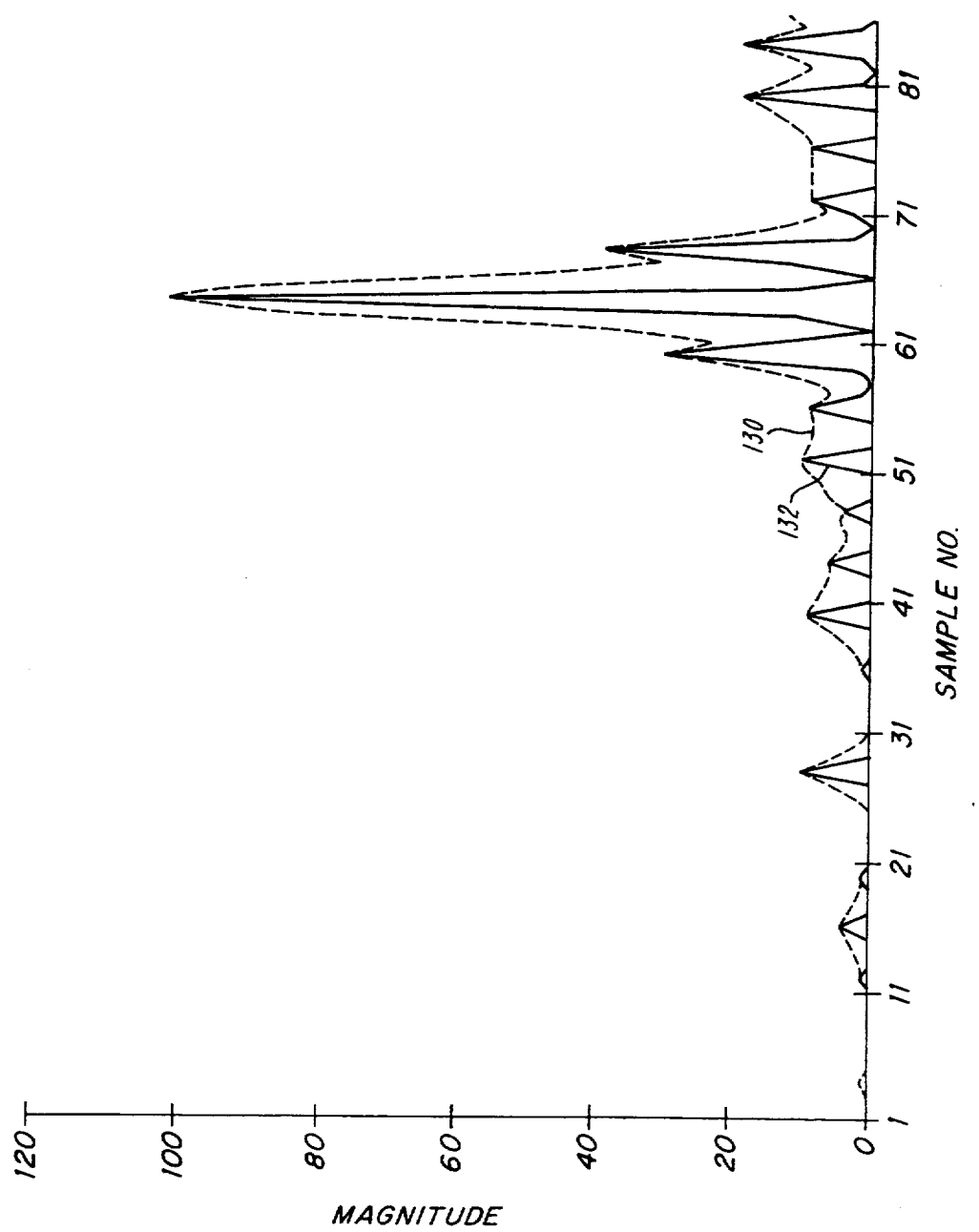
FIG. 7 is a plot comparing the performance of lower bandwidth outer code processing and processing of a inner/outer code combination.

The matched filter outputs for both cases are shown in the FIG. 7 as simulated in the DSP chip code simulator with computer generated input data. As can be seen, the lower bandwidth code results in much broader sidelobes for an output 130. The inner/outer code combination provides the narrower sidelobes for an output 132. The peak level of the high-bandwidth-code sidelobes is the same as the low-bandwidth code, resolution is improved. The factor of 4 in resolution results in a factor of 2 in minimum depth.

The inner code used is $++-+$ and has an autocorrelation of 4,0,0,0 if it is repeated with no phase reversal. A phase reversal on an adjacent outer code chip can be found as a correlation of the 8 chip sequence $++-+--+-$, with $++-+$, and is $4,-2,0,2,-4$. Now the maximum inner code sidelobe ($=2$) is only 6 dB down from the inner code peak, but occurs only when there is a flip in the resultant of the product of 2 outer codes (signal and reference). A large number of phase flips in the outer code will result in a small outer code sidelobe as there will not be much sign reinforcement. These occurrences will sum to produce the correlation sidelobe output. Hence, when there is a large outer-code sidelobe, there is a low inner code sidelobe. This qualitative argument is reflected quantitatively in the simulated matched filter outputs of FIG. 7 comparing 2.5 kHz and 10 kHz. The narrower outputs are from the higher rate codes.

Matched Filter Processing

Signal detection usually requires more signal-to-noise ratio than tracking or demodulation for satisfactory performance. In order to achieve sufficient SNR in the detection process we perform the matched filter function over a duration equal to 4 data bits. In order to satisfy Doppler constraints we do this in 2 halves, with each half coherently matched-filtered, and the results are non-coherently combined. Using 2 bits coherent followed by 2 bits of non-coherent combining for the matched filter detection provides an appropriate tradeoff of Doppler tolerance for signal-to-noise ratio.

The total detection waveform uses 16 outer chips for a net of 64 100-us-long chips. Extensive computer simulation was done to select the best code from all 65k possible combinations of 16 chips. The best code is the one that, under conditions of any delay of a reflected path, had the lowest sidelobe structure while displaying the minimum reduction in amplitude of the mainlobe. A single code emerged as providing better performance than the others. In addition, there were alternative codes that were not far behind the selected choice.

Transmitted Waveform

Figure 8:
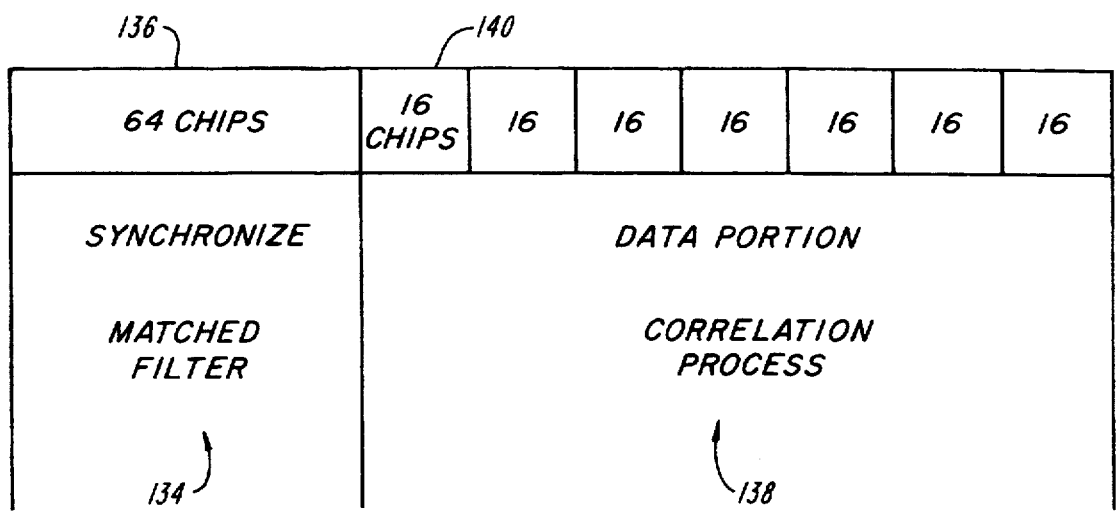
FIG. 8 is a diagram of an embodiment of the transmitted waveform structure.

A diagram of the transmitted waveform is shown in FIG. 8. The Synchronization preamble 134 described above is shown followed directly by the data waveform 138. The spread spectrum code structure is generated by a 15 stage m-sequence shift register generator producing a 32,767 chip long sequence. That is, the code repeats after 3.27 sec (nearly 2000 data bits). This value was chosen for convenient tap structures in the sequence generator; although, there is some improvement in the sidelobe distribution of longer codes over shorter codes. The data symbols 140 only use 16 chips per symbol. Other values can be used as well. A tradeoff of data rate for processing gain must be made. For example, symbol rates of 312.5 baud use 32 chips/symbol for a 10 kHz DS-PN chip rate.

Detection and Demodulation

To eliminate the effects of pulsed interference (and also the effect of a normalized interferer suddenly dropping out), constant-false-alarm-rate detection (CFAR) was implemented. This is a "feed-forward" technique and has immediate response to the input. The CFAR filter is a sliding window "averager" that operates on the same time scale as the matched filter, but uses magnitude-squared inputs rather that the signed, linear samples of the matched filter input. The matched filter coherently sums CMF outputs, which in turn are the coherent sums of the I and Q stepping window presumed outputs. (The stepped-window "presummer" is simply a sampled low-pass filter having a 10-kHz-output bandwidth).

The embodiment uses a CFAR circuit that takes every fourth I,Q pair of stepped-window presummer outputs, takes the sum of their squares, and stores them in a 16-word-long shift register where it performs the integration. Thus the CFAR output circuit tracks the power of the signal stored in the matched filter at any instant. Ideally, every sample of the stepping window outputs would be used and the sliding window would be 64 samples long, as is the case in the matched filter. However, processing power limits us to only use one fourth of the samples. An error can result if there is a large jump in level between the CFAR inputs. The matched filter will see this immediately but the CFAR may not respond for as many as 3-stepped-window outputs later. This is dealt with by delaying the matched filter output in the detector so that a later CFAR sample is used for comparison. In the case of interference dropout, the matched filter noise output will drop before the delayed CFAR output, thus we must compare to both the earlier and the delayed CFAR outputs, and force both results to be true prior to declaring a detection.

Figure 9:
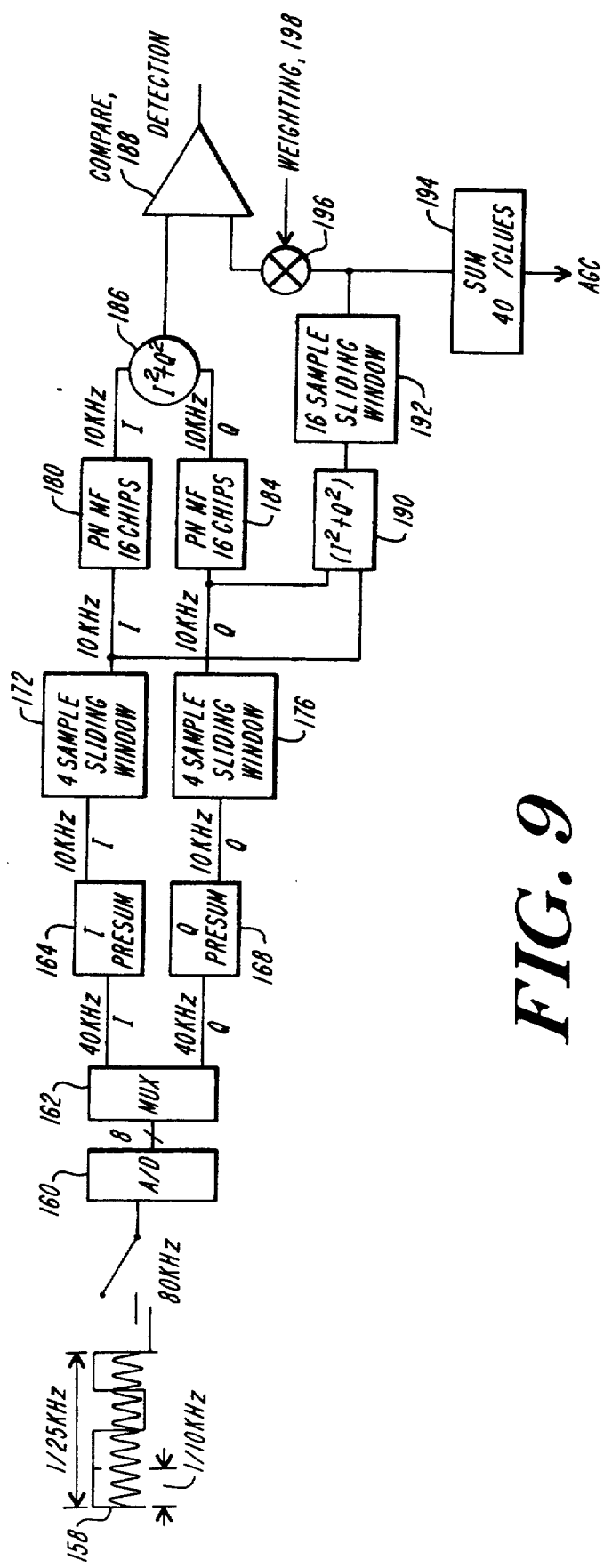
FIG. 9 is a schematic diagram of an embodiment of the steps of signal processing in the matched filter processor of FIG. 5B.

FIG. 9 shows the block diagram of the receiver signal processing circuit with the CFAR detection filter in place. I and Q samples of the input signal are A/D converted 160 and fed to I and Q presummers 164,168 by a multiplexer 162. The outputs of the I and Q presummers are each averaged in a 4-sample sliding window averager 172,176. These averaged outputs are then input to 16-chip matched filters 180,184, and to a circuit which squares and sums the inputs 190 and then averages the results in a 16-sample sliding window averager 192. The output of the averager feeds a 40 sample summer, which is used for automatic gain control (AGC). The averager output is weighted 196 with a nominal detection threshold value 198. The result is compared 188 with the sum of the squares 186 of the matched filter outputs.

The CFAR better idealizes the detection process as it forces the comparison to be between the coherent output and the noncoherent output. It thus becomes a test for coherence of the signal.

The block diagram in FIG. 10 shows the signal flow for the correlator mode of operation. The PN signal 208 is the pseudonoise spread spectrum code which multiplies by the incoming waveform 206, which has been A/D converted 204, to create the correlation. The timing of the PN code is modulated by a small fraction of a code chip at the byte rate such that a sequential-dither delay-locked tracking loop may be operated. The output of the multiplier 212 feeds a multiplexer 214, which separates the result in I and Q components which are the presummed 216,218. The presummer outputs are squared and summed 222. The magnitudes are then added (noncoherently) in summer 234 over 10 symbols to maintain the tracking loop and the dropout detection.

To perform the DPSK demodulation, a complex (in the mathematical sense) multiply is performed between the presummer outputs 228 and a 1-bit delayed presummer output 224 to demodulate the data 230.

Digital Circuits

Figure 11:
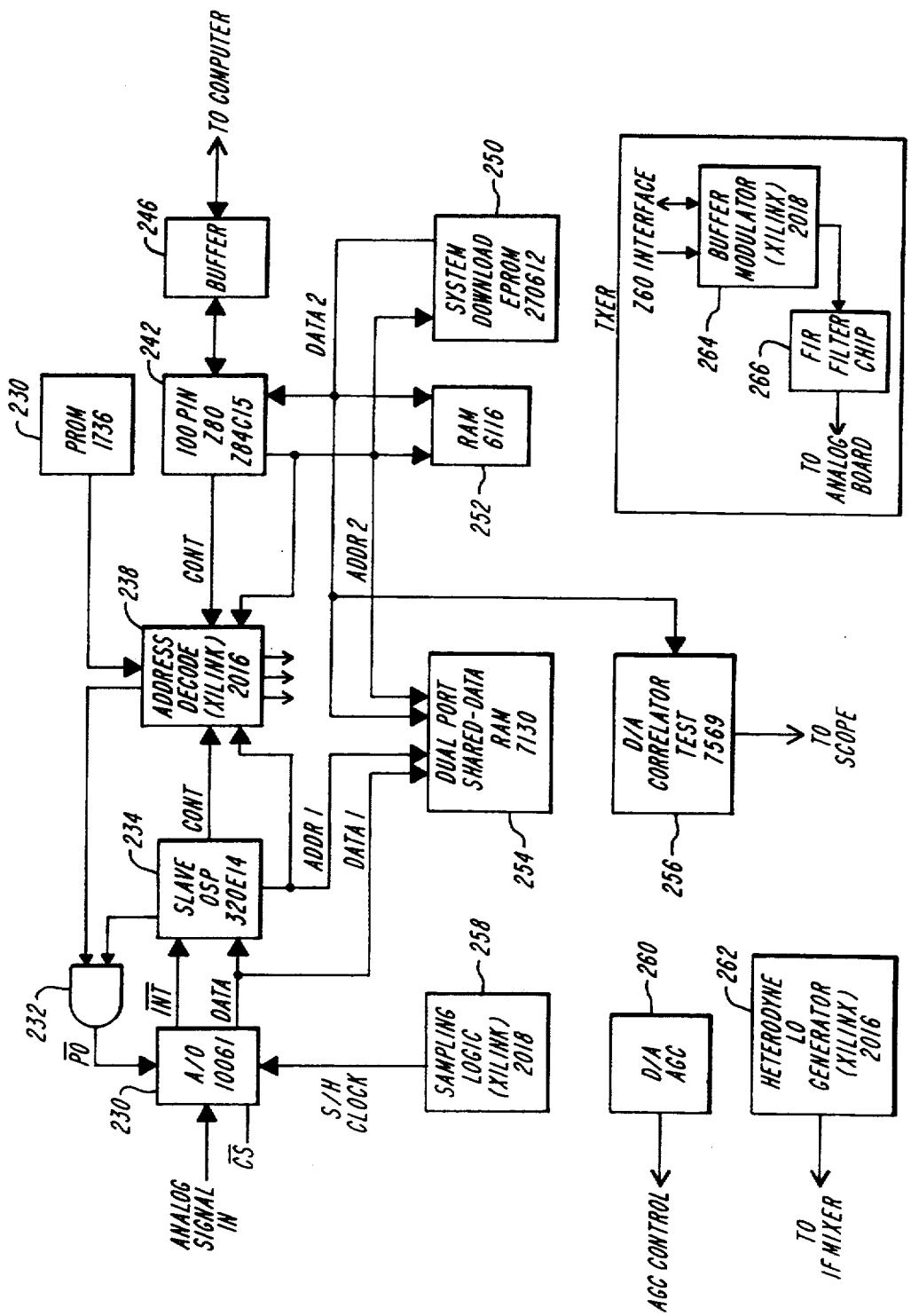
FIG. 11 is a block diagram of an embodiment of the digital signal processing and control hardware of FIG. 6.

The digital circuit block diagram for this embodiment shown in FIG. 11. The signal processing design of the described embodiment can be implemented with three major digital components: 1) A digital signal processor (DSP) chip 234; 2) A field-programmable gate array (FPGA) 238,264,262,232, and 258 which is configured for operation from PROM memory 236; and 3) a control microprocessor 242.

The DSP chip 234 processes the sampled IF signal that is fed to the A/D converter 230; it provides the computationally intensive functions of matched filtering, correlation and data demodulation. The control microprocessor 242 makes higher-level timing and control decisions that setup the operations performed by the DSP chip. For example, after the DSP chip indicates a detection to the control microprocessor during one of its routine handshakes, the microprocessor then instructs the DSP chip as to how to hand off timing information and control to the correlator portion of the DSP chip software including the realignment of DS-PN code and symbol timing. The control microprocessor 242 also manages the data interface 268 to the host computer through RS-232 buffer 246. The DSP chip and the control microprocessor communicate control information through a shared (dual port) RAM 254. The control microprocessor uses RAM chip 252 and PROM chip 250 for operation and storage of its software.

The FPGA provides the "glue" logic for the digital board including address decoding 238 and 232 and data latching 238. It also contains the logic to control the transmit FIR filter 266, the modulation logic 264, the PN code generators for transmitting 264, the timing circuits to generate the sampling waveform for the A/D converter 258, the transmit local oscillator counters 262, and the power control 266 and AGC latches 260.

In order to remain synchronized, the DSP chip and the control microprocessor "handshake" through the dual-port RAM 254. A D/A converter 256 has also been incorporated in the digital board design for testing purposes.

Other modifications and implementations will occur to those skilled in the art without departing from the spirit and the scope of the invention as claimed. Accordingly, the above description is not intended to limit the invention except as indicated in the following claims.

What is claimed is:

1. A high data rate hydroacoustic communication system comprising:
   a receiver including:
   low noise amplifier;
   filter to set receiver bandwidth;
   at least one heterodyne stage;
   normalizing circuitry to preserve dynamic range;
   analog-to-digital converter;
   digital signal processing chip; and
   a data buffer and control block; and
   a transmitter including:
   a spread spectrum waveform generator;
   a heterodyne state;
   a power amp; and
   a matching circuit.

2. A high data rate hydroacoustic communication system comprising:
   a receiver including:
   a hydroacoustic transducer for providing an analog signal in accordance with a hydroacoustic signal;
   a signal conditioning stage, responsive to the hydroacoustic signal, for providing a digital signal in accordance with the hydroacoustic signal;
   a digital signal processor, responsive to the digital signal, for performing upon the digital signal, direct-sequence-spread spectrum matched filtering and serial correlation against a direct-sequence-spread spectrum reference signal; and
   a control processor, cooperative with the digital signal processor, for providing control information to the digital signal processor.

3. A method of hydroacoustically communicating data at a high data rate using a direct-sequence-pseudonoise-spread-spectrum-modulated hydroacoustic data signal, the method comprising the steps of:
   receiving the signal, including the steps of:
   transducing the signal to provide an electrical signal;
   conditioning the electrical signal to provide a conditioned signal;
   performing matched filtering upon the conditioned signal to obtain a match-filtered signal;
   performing signal detection upon the match-filtered signal to provide a trigger signal;
   performing reference code timing in at least one correlator in response to the trigger signal to provide at least one synchronized correlator;
   performing correlation upon the conditioned signal to obtain a correlated signal; and
   performing data demodulation upon the correlated signal to obtain the data.

4. The method of claim 3, wherein after the step of performing correlation, the method further comprises the steps of:
   performing signal detection and noncoherent summation upon the correlated signal to obtain a tracking signal; and
   performing timing control in accordance with the tracking signal to maintain reference code synchronization.

5. The method of claim 3, wherein the step of conditioning the electrical signal includes the steps of:
   preamplifying, filtering, and signal normalizing the electrical signal so as to provide a conditioned signal.

6. The method of claim 3, wherein the step of conditioning the electrical signal includes the step of:
   preamplifying, filtering, heterodyning, and signal normalizing the electrical signal so as to provide a conditioned signal.

7. The method of claim 3, wherein the step of conditioning the electrical signal includes the steps of:
   preamplifying, filtering, analog-to-digital convening, and signal normalizing the electrical signal so as to provide a conditioned signal.

8. The method of claim 3, wherein the step of conditioning the electrical signal includes the step of:
   preamplifying, filtering, analog-to-digital convening, heterodyning, and signal normalizing the electrical signal so as to provide a conditioned signal.

9. The method of claim 3, wherein the step of performing matched filtering upon the conditioned signal includes the steps of:
   sampling the conditioned signal to create in-phase and quadrature-phase signals;
   pre-summing a number of samples of each of the signals to provide a pair of pre-summed signals, each pre-summed signal being filtered to the scale of a spread spectrum code rate; and
   performing a matched-filter function, using the reference code on each filtered signal, to obtain a pair of matched-filtered signals.

10. The method of claim 9, wherein the matched-filter function, using the reference code on each presumed signal, includes the step of:

performing transversal filtering using tap weights determined by the reference code to obtain a pair of matched-filtered signals.

11. The method of claim 9, wherein the matched-filter function, using the reference code on each pre-summed signal, includes the step of:
performing transversal filtering using tap weights determined by an inner reference code, and tap weights determined by an outer reference code, so as to provide a pair of matched-filtered signals.

12. The method of claim 3, wherein the step of performing signal detection upon the pair of matched-filtered signals includes the steps of:
combining the pair of matched-filtered signals to provide an envelope signal of the pair of matched filtered signals; and
performing a threshold detection by comparing an amplitude of the envelope signal to a pre-specified threshold so as to provide a trigger signal when the amplitude of the envelope signal exceeds the pre-specified threshold.

13. The method of claim 3, wherein the step of performing signal detection upon the pair of matched-filtered signals includes the steps of:
combining a pair of matched-filtered signals to provide an envelope signal of the pair of matched filtered signals; and
performing a threshold detection by comparing an amplitude of the envelope signal to a signal-dependent threshold so as to provide a trigger signal when the amplitudes of the envelope signal exceeds the signal-dependent threshold.

14. The method of claim 13, wherein the step of performing a threshold detection by comparing the amplitude of the envelope signal to the signal-dependent threshold to provide a trigger signal includes the steps of:
sensing a pair of partially processed signals to provide a pair of signal-power levels;
combining signal-power levels to provide a signal-power level envelope;
performing a noncoherent summation on a sequence of the signal-power level envelope values; and
performing a weighting of a threshold signal with the noncoherent summation to provide the signal dependent threshold.

15. The method of claim 3 wherein the step of performing reference code timing in at least one correlator in response to the trigger signal includes the steps of:
adjusting an index of a circulating buffer memory that stores samples of the conditioned signal so as to provide at least one synchronized correlator.

16. The method of claim 3, wherein the step of performing correlation upon the conditioned signal includes the steps of:
repeatedly sampling the conditioned signal to create an in-phase signal sequence and a quadrature-phase signal sequence;
multiplying the signal sequences by the reference code to create a pair of multiplied-sample sequences; and
summing a plurality of multiplied samples in each of the multiplied sample sequences to provide a filtered pair of data signals that are filtered to the data bandwidth.

17. The method of claim 16, wherein the step of performing demodulation of the data signal includes the step of:

delaying for a one data-bit-duration the pair of filtered data signals to provide a delayed signal pair;
performing a complex multiply of the delayed signal pair and a complex conjugate of the pair of filtered data signals to provide a demodulation signal; and
determining a phase of the demodulation signal to provide the data.

18. A method of hydroacoustically communicating data at a high data rate using a direct-sequence-pseudonoise-spread-spectrum-modulated hydroacoustic signal also modulated by data, said method comprising the steps of:
transmitting the signal, including the steps of:
(a) generating a pseudonoise sequence provided as a pseudonoise electrical signal;
(b) performing an antipodal, bi-phase modulation of a carrier signal by the pseudonoise electrical signal and by data to provide a transmit signal;
(c) amplifying, power controlling and filtering the transmit signal so as to provide an acoustic signal; and
(d) transducing the conditioned signal to provide an acoustic signal.

19. Apparatus for hydroacoustically communicating data at a high data rate use a direct-sequence-pseudonoise-spread-spectrum-modulated hydroacoustic data signal, said apparatus comprising:
means for transmitting the signal, including:
means for generating a pseudonoise sequence provided as an electrical signal;
means for performing antipodal, bi-phase modulation of a carrier signal by the pseudonoise electrical signal and by data to provide a transmit signal;
means for amplifying, power controlling and filtering the transmit signal so as to provide a conditioned signal; and
means for transducing the conditioned signal to provide an acoustic signal.

20. The apparatus of claim 19, wherein the means for filtering includes means for finite-impulse-response-filtering the transmit signal.

21. In a high data rate hydroacoustic communication system for processing a hydroacoustic signal received by a receiver from a transmitter, said receiver comprising:
means for providing an information signal representative of said hydroacoustic signal;
signal processor means for performing .upon said information signal, direct-sequence-spread-spectrum matched filtering and serial correlation against a direct-sequence-spread-spectrum reference signal; and
a processor, responsive to said signal processor means, for providing control information to the signal processor means.

22. Apparatus for high data rate hydroacoustic communications using a direct-sequence-pseudonoise-spread-spectrum-modulated hydroacoustic signal also modulated by data, the apparatus comprising:
means for transmitting the signal including:
means for generating a pseudonoise sequence provided as a pseudonoise electrical signal;
means for antipodal, bi-phase modulating a carrier signal with the pseudonoise electrical signal and with data so as to provide a transmit signal;

means for amplifying, power controlling and filtering the transmit signal so as to provide a conditioned signal; and means for transducing the conditioned signal so as to provide an acoustic signal.

23. The method of claim 18, wherein the step of filtering includes the step of by finite impulse response filtering the transmit signal.

24. Apparatus for hydroacoustically communicating data at a high data rate using a direct-sequence-pseudonoise-spread-spectrum-modulated hydroacoustic signal also modulated by data, the apparatus comprising:

means for receiving the signal, including:
 means for transducing the signal to provide an electrical signal;
 means for conditioning the electrical signal to provide a conditioned signal;
 means for performing matched filtering upon the conditioned signal to obtain a match-filtered signal;
 means for performing signal detection upon the match-filtered signal to provide a trigger signal;
 means for performing reference code timing in at least one correlator in response to the trigger signal to provide at least one synchronized correlator;
 means for performing correlation upon the conditioned signal to obtain a correlated signal; and
 means for performing data demodulation upon the correlated signal to obtain the data.

25. Apparatus for hydroacoustically communicating data at a high data rate using a direct-sequence-pseudonoise-spread-spectrum-modulated hydroacoustic data signal, said apparatus comprising:

means for receiving the hydroacoustic data signal, including:
 means for transducing the signal to provide an electrical signal;
 means for conditioning the electrical signal to provide a conditioned signal;
 means for performing matched filtering upon the conditioned signal to obtain a match-filtered signal;
 means for performing signal detection upon the match-filtered signal to provide a trigger signal;
 means for performing reference code timing in at least one correlator in response to the trigger signal to provide at least one synchronized correlator;
 means for performing correlation upon the conditioned signal to obtain a correlated signal; and
 means for performing data demodulation upon the correlated signal to obtain the data.

26. The apparatus of claim 25, wherein the means for performing correlation upon the conditioned signal includes:

means for repeatedly sampling the conditioned signal to create an in-phase signal sequence and a quadrature-phase signal sequence;
means for multiplying the signal sequences by the reference code to create a pair of multiplied-sample sequences; and
means for summing a plurality of multiplied samples in each of the multiplied sample sequences to provide a filtered pair of data signals that are filtered to the data bandwidth.

27. The apparatus of claim 26, wherein the means for performing demodulation of the data signal includes:

means for delaying for a one data-bit-duration the pair of filtered data signals to provide a delayed signal pair;
means for performing a complex multiply of the delayed signal pair and a complex conjugate of the pair of filtered data signals to provide a demodulation signal; and
means for determining a phase of the demodulation signal to provide the data.

28. The apparatus of claim 25 further comprising:

means for performing signal detection and noncoherent summation upon the correlated signal to obtain a tracking signal; and
means for performing timing control in accordance with the tracking signal to maintain reference code synchronization.

29. The apparatus of claim 25, wherein the means for conditioning the electrical signal includes:

means for preamplifying, filtering, and signal normalizing the electrical signal so as to provide a conditioned signal.

30. The apparatus of claim 25, wherein the means for conditioning the electrical signal includes means for:

preamplifying, filtering, heterodyning, and signal normalizing the electrical signal so as to provide a conditioned signal.

31. The apparatus of claim 25, wherein the means for conditioning the electrical signal includes:

means for preamplifying, filtering, analog-to-digital converting, and signal normalizing the electrical signal so as to provide a conditioned signal.

32. The apparatus of claim 25, wherein the means for conditioning the electrical signal includes:

means for preamplifying, filtering, analog-to-digital converting, heterodyning, and signal normalizing the electrical signal so as to provide a conditioned signal.

33. The apparatus of claim 25, wherein the means for performing matched filtering upon the conditioned signal includes:

means for sampling the conditioned signal to create in-phase and quadrature-phase signals;
means for pre-summing a number of samples of each of the signals to provide a pair of pre-summed signals, each pre-summed signal being filtered to the scale of a spread spectrum code rate; and
means for performing a matched-filter function, using the reference code on each filtered signal, to obtain a pair of matched-filtered signals.

34. The apparatus of claim 33, wherein the means for performing a matched-filter function includes:

means for performing transversal filtering using tap weights derived from the reference code to obtain a pair of matched-filtered signals.

35. The apparatus of claim 33, wherein the means for performing a matched-filter function includes:

means for performing transversal filtering using tap weights derived from an inner reference code, and tap weights derived from an outer reference code, so as to provide a pair of matched-filtered signals.

36. The apparatus of claim 25, wherein the means for performing signal detection upon the pair of matched-filtered signals includes:

means for combining the pair of matched-filtered signals to provide an envelope signal of the pair of matched filtered signals; and means for performing a threshold detection by comparing an amplitude of the envelope signal to a pre-specified threshold so as to provide a trigger signal when the amplitude of the envelope signal exceeds the pre-specified threshold.

37. The apparatus of claim 25, wherein the means for performing signal detection upon the pair of matched-filtered signals includes:
   means for combining a pair of matched-filtered signals to provide an envelope signal of the pair of matched filtered signals; and
   means for performing a threshold detection by comparing an amplitude of the envelope signal to a signal-dependent threshold so as to provide a trigger signal when the amplitudes of the envelope signal exceeds the signal-dependent threshold.

38. The apparatus of claim 37, wherein the means for performing a threshold detection by comparing the amplitude of the envelope signal to the signal-dependent threshold to provide a trigger signal includes:
   means for sensing a pair of partially processed signals to provide a pair of signal-power levels;
   means for combining the signal-power levels to provide a signal-power level envelope;
   means for performing a noncoherent summation on a sequence of the signal-power level envelope values; and
   means for performing a weighting of a threshold signal with the noncoherent summation to provide the signal dependent threshold.

39. The apparatus of claim 25 wherein the means for performing reference code timing in at least one correlator in response to the trigger signal includes:
   means for adjusting an index of a circulating buffer memory that stores samples of the conditioned signal so as to provide at least one synchronized correlator.

* * * * *

UNITED STATES PATENT AND TRADEMARK OFFICE
CERTIFICATE OF CORRECTION

PATENT NO. : 5,412,620
DATED : May 2, 1995
INVENTOR(S) : John H. Cafarella, Stanley A. Reible, Jeffrey H. Fischer, Kendrick R. Bennett It is certified that error appears in the above-indentified patent and that said Letters Patent is hereby corrected as shown below:

Claim 7, column 14, line 46, delete "convening" and substitute therefor —converting—;

Claim 8, column 14, line 51, delete "convening" and substitute therefor —converting—;

Claim 10, column 14, line 67, delete "presumed" and substitute therefor —pre-summed—;

Claim 19, column 16, line 26, delete "use" and substitute therefor —using—.

Signed and Sealed this

Sixteenth Day of January, 1996

*Attest:*

BRUCE LEHMAN

*Attesting Officer*  *Commissioner of Patents and Trademarks*